United States Patent [19]

Mann et al.

[11] Patent Number: 5,121,905
[45] Date of Patent: Jun. 16, 1992

[54] RESILIENT MOUNT

[75] Inventors: David W. Mann, Akron; Bruce J. Senecal, Munroe Falls, both of Ohio

[73] Assignee: Karman Rubber Company, Akron, Ohio

[21] Appl. No.: 578,510

[22] Filed: Sep. 6, 1990

[51] Int. Cl.⁵ .............................................. F16F 7/00
[52] U.S. Cl. ................................... 267/141.4; 267/136
[58] Field of Search ............... 267/136, 141, 141.1, 267/141.2, 141.3, 141.4, 141.5, 153

[56] References Cited

U.S. PATENT DOCUMENTS

| | | | |
|---|---|---|---|
| 2,128,733 | 8/1938 | Riesling | 267/141.2 |
| 2,132,840 | 12/1936 | Workman et al. | 248/22 |
| 2,538,658 | 10/1945 | Saurer | 248/358 |
| 2,675,202 | 4/1954 | Kaemmerling | 267/141.5 |
| 2,869,811 | 1/1959 | Boschi | 267/141.4 |
| 2,926,881 | 3/1960 | Painter | 267/141.4 |
| 3,060,538 | 11/1959 | Simi | 24/221 |
| 3,448,949 | 4/1969 | Kelley | 267/153 |
| 4,012,071 | 3/1977 | Jones et al. | 296/35 |

*Primary Examiner*—Matthew C. Graham
*Attorney, Agent, or Firm*—Oldham, Oldham & Wilson Co.

[57] ABSTRACT

The present invention relates to a fail safe resilient mount which includes an outer dome shaped member having an aperture centered about an apex thereof and oppositely diposed ears extending therefrom, an inner bell shaped member axially offset from said outer member having a centered aperture at a top thereof and a locking member therein and an elastomeric material encapsulating and bonded to a domed portion of the outer member and encapsulating and bonded to the inner member and interposed between an inner surface of the outer member and an outer surface of the inner member.

11 Claims, 2 Drawing Sheets

1

RESILIENT MOUNT

TECHNICAL FIELD

This invention relates to a fail safe resilient mount which can vibrationally insulate a support structure from a load and is removable and repositionable on the support structure.

BACKGROUND OF THE INVENTION

Numerous patents have described resilient motor mounts. U.S. Pat. No. 2,132,840 describes a motor mount consisting of a dome shaped outer portion of rubber, merging into frustoconical shaped metal members disposed so that the members have flanges embedded in the rubber.

U.S. Pat. No. 2,538,658 describes another resilient mounting where the larger metal member in the makeup of the mount, has air gaps available to it for compressible fluids or gasses to aid in either enhanced vibrational damping or resilience.

SUMMARY OF THE INVENTION

An object of this invention is to provide a fail safe resilient mount for vibrationally insulating a support structure from an attached load.

A further object of the present invention is to provide a fail safe resilient mount where the fail safe feature is achieved by a dome shaped outer member having an aperture centered about an apex thereof, of a diameter sufficient to allow an inner bell shaped member to protrude therefrom but not pass therethrough.

A further object of this invention is to provide a fail safe resilient mount where the resilience is achieved by encapsulating a dome portion of the outer member and the entire inner member with an elastomeric material and interposing a sufficient amount of the elastomeric material between an inner surface of said domed portion of said outer member and the outer surface of the inner member to provide for vibrational insulation.

A further aspect of this invention is to provide a fail safe resilient mount where the inner member has an associated locking member thereon.

A further aspect of this invention is to provide a fail safe resilient mount where the inner member has a polygonal shaped sidewall extending from a top surface portion to about a mid surface of said inner member adapted to receive a locking member and a locking member inserted therein.

A further aspect of this invention is to provide a fail safe resilient mount where the elastomeric member is interposed between the sidewall of the inner member and the locking member.

A further aspect of the present invention is to provide a fail safe resilient mount where the inner member has a locking member built therein.

A still further aspect of the present invention is to provide a fail safe resilient mount where the shape of the mount is a frustoconical shape.

The fail safe resilient mount of the present invention includes an outer dome shaped member having an aperture centered about an apex thereof and oppositely disposed ears extending therefrom, an inner bell shaped member axially offset from said outer member having a centered aperture at a top thereof and a locking member therein and an elastomeric material encapsulating and bonded to a domed portion of the outer member and encapsulating and bonded to the inner member and interposed between an inner surface of the outer member and an outer surface of the inner member.

The elastomeric material surrounds and bonds to the domed portion of the outer and inner surfaces of the outer member and completely surrounds and bonds to the inner member. A sufficient amount of the material is interposed between an inner surface of the outer member and an outer surface of the inner member to vibrationally insulate the outer member from the inner member.

The aperture in said outer member is adapted to allow the inner member to protrude therefrom and to prevent the inner member from passing therethrough.

The ears of the outer member have an aperture therein adapted to receive a screw for removable attachment to a support structure. The aperture in said inner member has an opening sufficient to allow a bolt to engage said locking member for anchoring a load to the support structure via the mount.

One embodiment of the mount includes an inner bell-shaped member having a polygonal shaped inner surface sidewall extending from a top surface portion to about a mid surface portion of the inner member and adapted to receive a locking member. The sidewall is formed having a slightly smaller diameter at the polygon vertices than said locking member so that insertion of said locking member into said inner member will require the exertion of sufficient force to provide a frictional lock between the outer surface of said locking member and said sidewall of said inner member. One other feature of this embodiment is to also have a part of the elastomeric material interposed between the sidewall and the locking member. Of course, this embodiment would render the locking member essentially non-removable. A variation of this embodiment would not have the elastomeric material interposed between the sidewall and the locking member so that the locking member could be inserted at a later time and more easily removed.

A second embodiment of the mount includes an inner bell-shaped member where the locking member is an integral part of the inner member. This embodiment provides a more integrated and streamlined mount in that the inner member has a locking member built directly into the member itself. This combination of these two elements may provide better easier manufacturing of the inner member in that standard casting techniques well known in the art can be used to form the member.

The mount of the present invention is especially tailored for applications which require relatively small sized, fail safe mounts. The preferred sizes for these mounts are from about 4 inches from ear to ear and about 1½ inches in height, to about 2 inches from ear to ear and about ¾ inches in height. However, larger and smaller mounts can also be made within the teaching of the present invention.

The elastomeric material can be composed of any material which has good resilience and good resistance to oxygen aging, such as, but not restricted to, cured rubber and the like. Cured rubber is meant to include all type of vulcanizates containing elastomers, fillers, antidegradants and a cure system, such as sulfur, metallic or radical cure systems. The elastomers can include, but are not restricted to, natural rubber, synthetic polydienes or polydiene containing elastomers, polyolefin elastomers, halogen containing polyolefin elastomers, polyenamine ketone elastomers and the like. Some possible rubbers which can be used in the present invention are: Natural, SBR, EPDM, Neoprene, EPDM/butyl Blends, Halo-Butyl Blends, Silicone, PPO, and other similar materials. The rubber chosen will normally have physical properties similar to sulfur or peroxide cured rubber compounds which exhibit good damping characteristics, good oxidative stability, good ozone stability, and good stability in humid conditions. The elastomeric members can be made by a variety of known processes for manufacturing rubber articles such as pressure molding, extrusion molding, injection molding and other similar processes.

Two representative and illustrative rubber compounding recipes for the rubber that goes into the manufacturing of the elastomeric member are shown below:

| 50 Durometer Natural Rubber | |
| --- | --- |
| Natural Rubber | 100 |
| Zinc Oxide | 5 |
| Stearic Acid | 2 |
| N660 Carbon Black | 20 |
| Naphthenic Process Oil | 2 |
| p-Phenylenediamine Antiozonant | 3 |
| Sulfenamide Accelerator | 0.6 |
| Sulfur | 2.5 |
| | 137.1 |
| 50 Durometer Neoprene | |
| Neoprene W | 100 |
| Magnesium Oxide | 4 |
| Zinc Oxide | 5 |
| Ethylene thiourea | 0.5 |
| Stearic Acid | 0.5 |
| N762 Carbon Black | 50 |
| | 160.0 |

The first example is for a natural rubber formulation while the second is for a neoprene formulation.

The material used to make the domed shaped outer member, the bell shaped inner member and the locking member can be, but is not restricted to, metals, compositions or ceramics. Metals which can be used for these members include, but are not restricted to, iron, steel, aluminum or alloys thereof. Composites useful for construction of these members include carbon, polyamide, polyester, fiberglass and the like. The ceramics useful for construction of the members can be any type of structural ceramics currently designed for high mechanical durability.

DETAILED DESCRIPTION OF THE INVENTION

Figure 1:
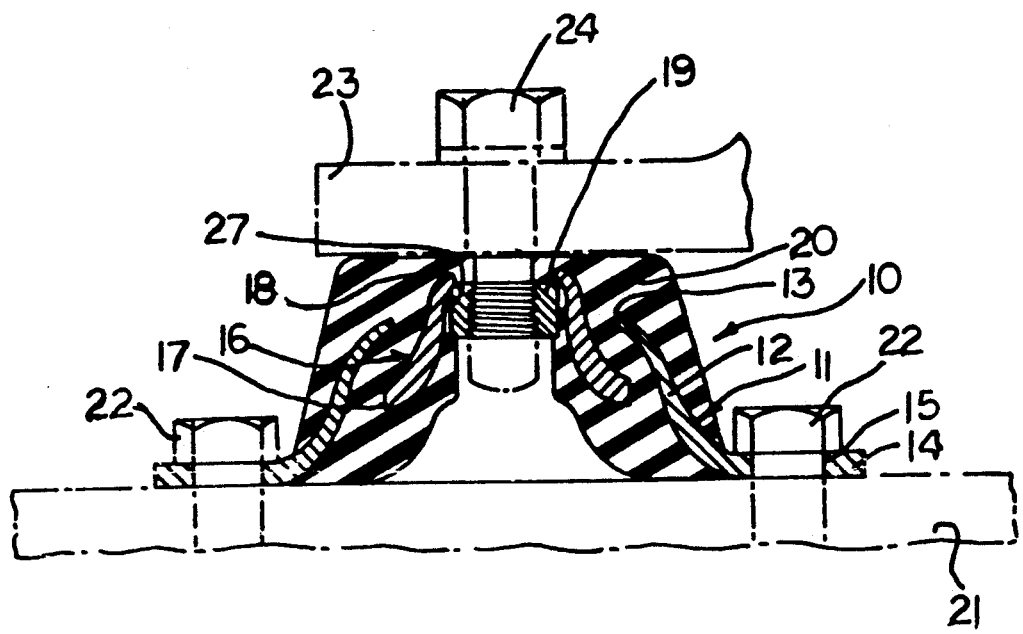
FIG. 1 is a cross sectional depiction of a fail safe resilient mount in one embodiment showing a portion of a support structure and a supported load operatively associated therewith.
Figure 4:
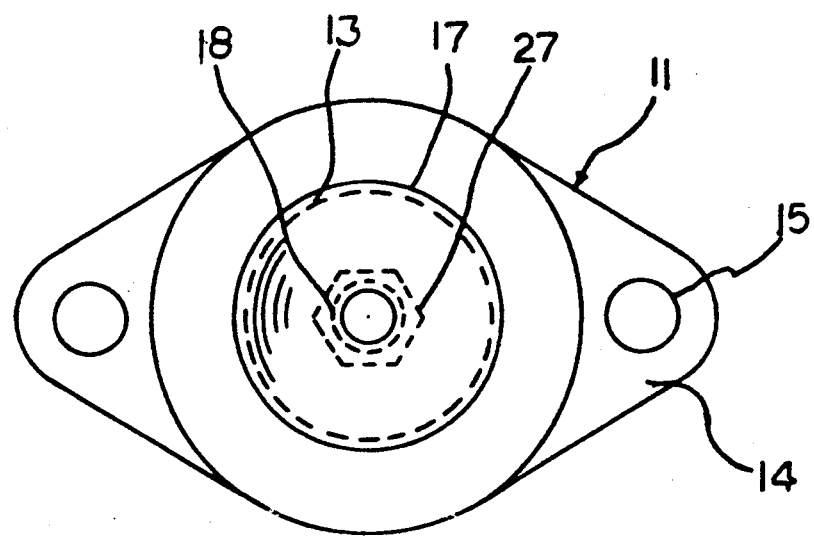
FIG. 4 is a bottom plane view of the embodiment of FIG. 1.

FIGS. 1 and 4 depict a first embodiment of the present invention where 10 is generally the fail safe resilient mount of the present invention, 11 is generally the domed shaped outer member, 12 is the domed shaped portion, 13 is the aperture centered about the apex of the domed portion. Also, 14 is one of the ears extending from the outer member and 15 is the aperture in the ear adapted to receive bolt 22 which secures the mount 10 to structural support 21.

Still referring to FIGS. 1 and 4, 16 is generally the bell shaped inner member, 17 is the base of the inner member, 18 is the centered aperture in the inner member, 27 is the polygonal side wall which extends from the top of the inner surface of the inner member to the mid portion of the inner member, adapted to receive locking member 19. The elastomeric material 20 encapsulates and is bonded to member 12 and encapsulates and is bonded to member 16. The amount of elastomeric material interposed between the outer surface of the inner member and the inner surface of the outer member is sufficient to result in vibrational insulation of the load 23 from the support structure 21. The elastomeric material 20 is also interposed between the sidewall 27 and the locking member 19 in this embodiment.

FIG. 4 shows the construction of FIG. 1 from a bottom plane view. The figure clearly shows the fail safe design of the present invention in that aperture 13 is smaller than base 17, thereby allowing member 16 to protrude axially above member 11 but not pass therethrough. The shape of these two members also has numerous advantages. First, the smooth contours of members 10 and 16 tend to reduce any sudden impact between the members due to catastrophic elastomer material failure. The smooth shape also reduces stress or strain concentration in the mount 10.

Figure 2:
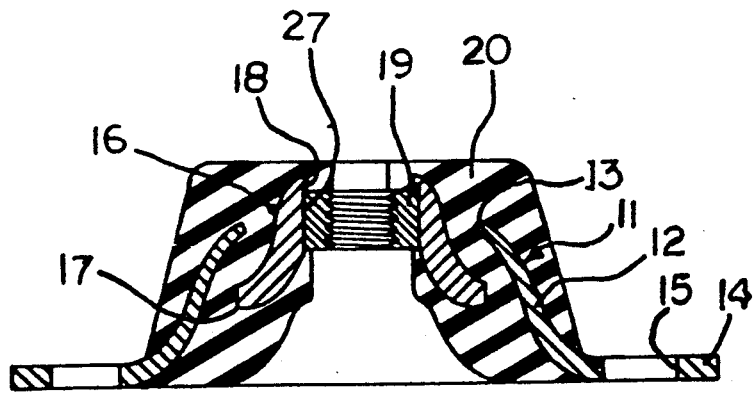
FIG. 2 is a view as in FIG. 1 of a variation of the first embodiment of the invention.

FIG. 2 shows a variation of the first embodiment of the present invention. The only difference is that locking member 19 and side wall 27 are not bonded in place by an interposing amount of elastomeric material 20. However, the side wall 17 is polygonal shaped and polygon vertices of side wall 27 are slightly smaller than the locking member 19 so that some amount of force must be exerted in inserting locking member 19, providing a frictional lock between the side wall 27 and locking member 19.

Figure 3:
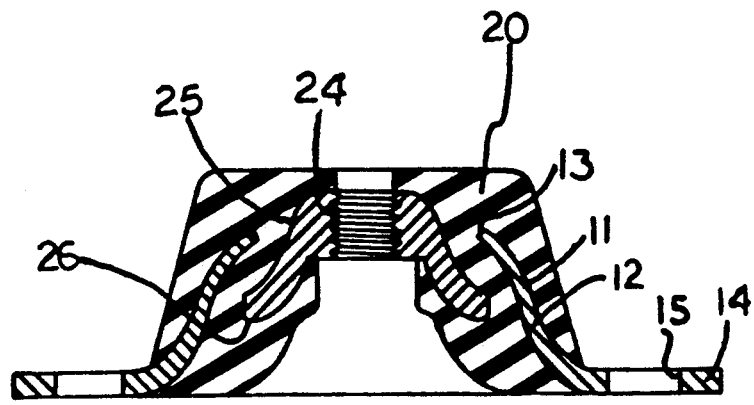
FIG. 3 is a view as in FIG. 1 of a second embodiment of the invention.

FIG. 3 shows a second embodiment of the present invention where locking member 19 and inner member 16 have been generally combined into one unit 25 so that no independent locking member is needed. The base 26 of member 25 is designed to be of a larger diameter than aperture 13 of the outer member to maintain the fail safe feature. Numeral 24 depicts the locking member as it is combined into member 25.

While in accordance with the patent statutes, the best mode and preferred embodiment of the invention have been described, it is to be understood that the invention is not limited thereto, but rather is to be measured by the scope and spirit of the appended claims.

What is claimed is:

1. A fail safe resilient mount having:
   (a) an outer dome shaped member with an opening centered about an apex thereof and oppositely disposed ears extending therefrom with an inner bell shaped member with a top smaller than its bottom, protruding partially through said opening but restricted from complete passage through said opening by degree of taper between said top and bottom relative to size of the opening;
   (b) said inner bell shaped member offset partially axially within said outer member and having a centered aperture at top thereof with an aligned locking member therein (c) a block of elastomeric material having a hollow through the center to permit a fastener to be attached to the locking member, said block bonding said outer dome shaped member and inner bell shaped member in their relationship by extending between said members and covering other exposed surfaces of said inner bell shaped members and said outer dome shaped members and extending above top of said projection of said inner member to distribute shock between said members.

2. A mount according to claim 1 wherein said mount has a size from about 4 inches from ear and about 1½ inches in height, to about 2 inches from ear to ear and about ¾ inches in height.

3. A mount according to claim 1, wherein said ears have an aperture therein to receive a fastening member.

4. A mount according to claim 1, wherein said aperture in said inner member has a sufficient diameter to allow a load fastening member to engage said locking member.

5. A mount according to claim 1, wherein said inner member has a polygonal shaped inner surface sidewall extending from the top of a inner surface to about a mid portion of said inner member to receive and hold said locking member against turning.

6. A mount according to claim 5, wherein said sidewall is slightly smaller in diameter than said locking member so that insertion of said locking member into said inner member will require the exertion of sufficient force to provide a frictional lock between the outer surface of said locking member and said sidewall of said inner member.

7. A mount according to claim 6, wherein said elastomeric material is further interposed between and bonded to a inner surface of said sidewall and said outer surface of said locking member.

8. A mount according to claim 1, wherein said dome shaped member and the inner bell shaped member are frustoconically shaped.

9. A mount according to claim 1, wherein said locking member is a threaded portion of an inner surface of said inner bell shaped member to engage a threaded load anchoring member.

10. A mount according to claim 1, wherein said inner and outer members are a reinforced composite.

11. A mount according to claim 1, wherein said inner and outer members are a reinforced graphite composite.

* * * * *